Figure 1:
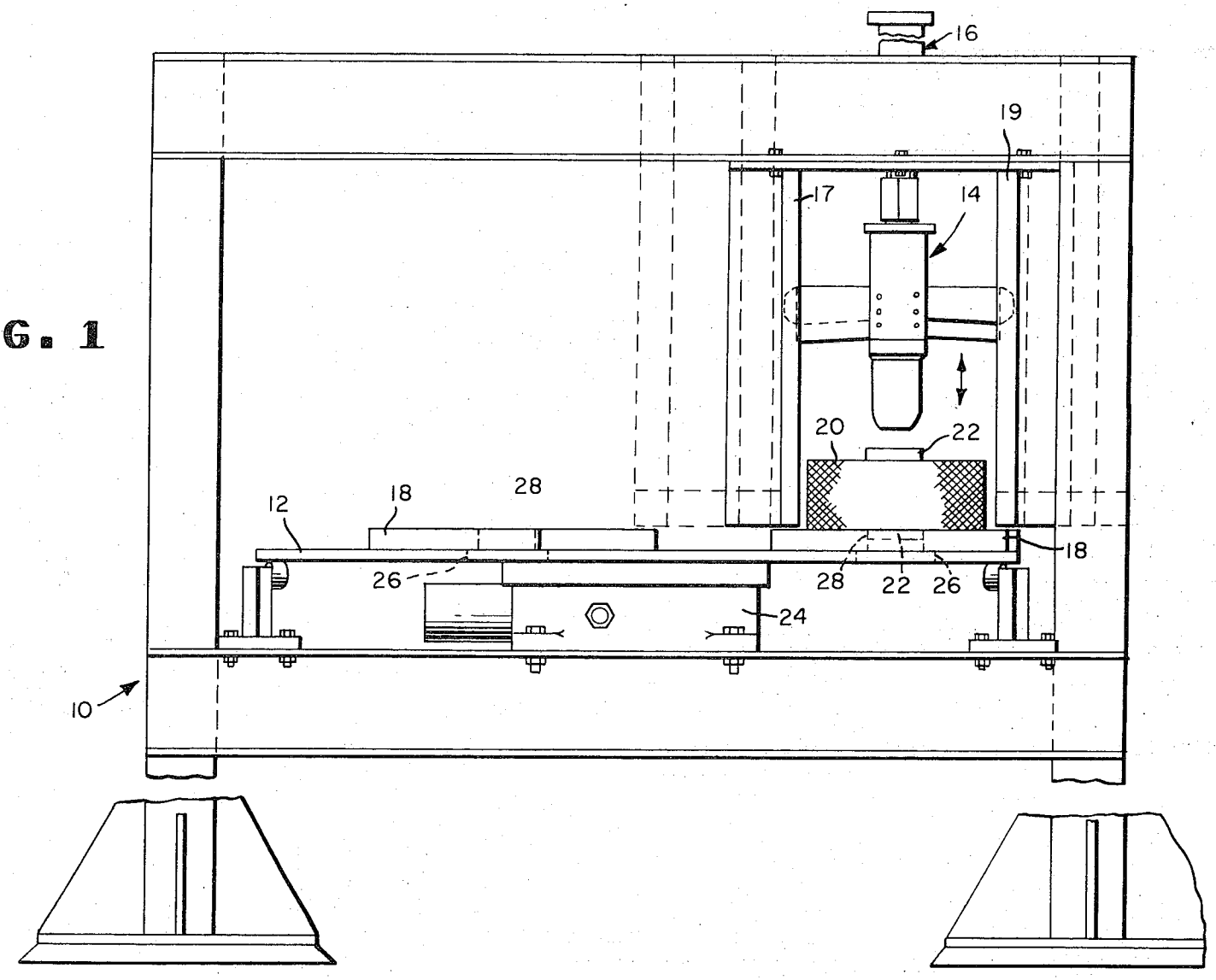
Figure 2:
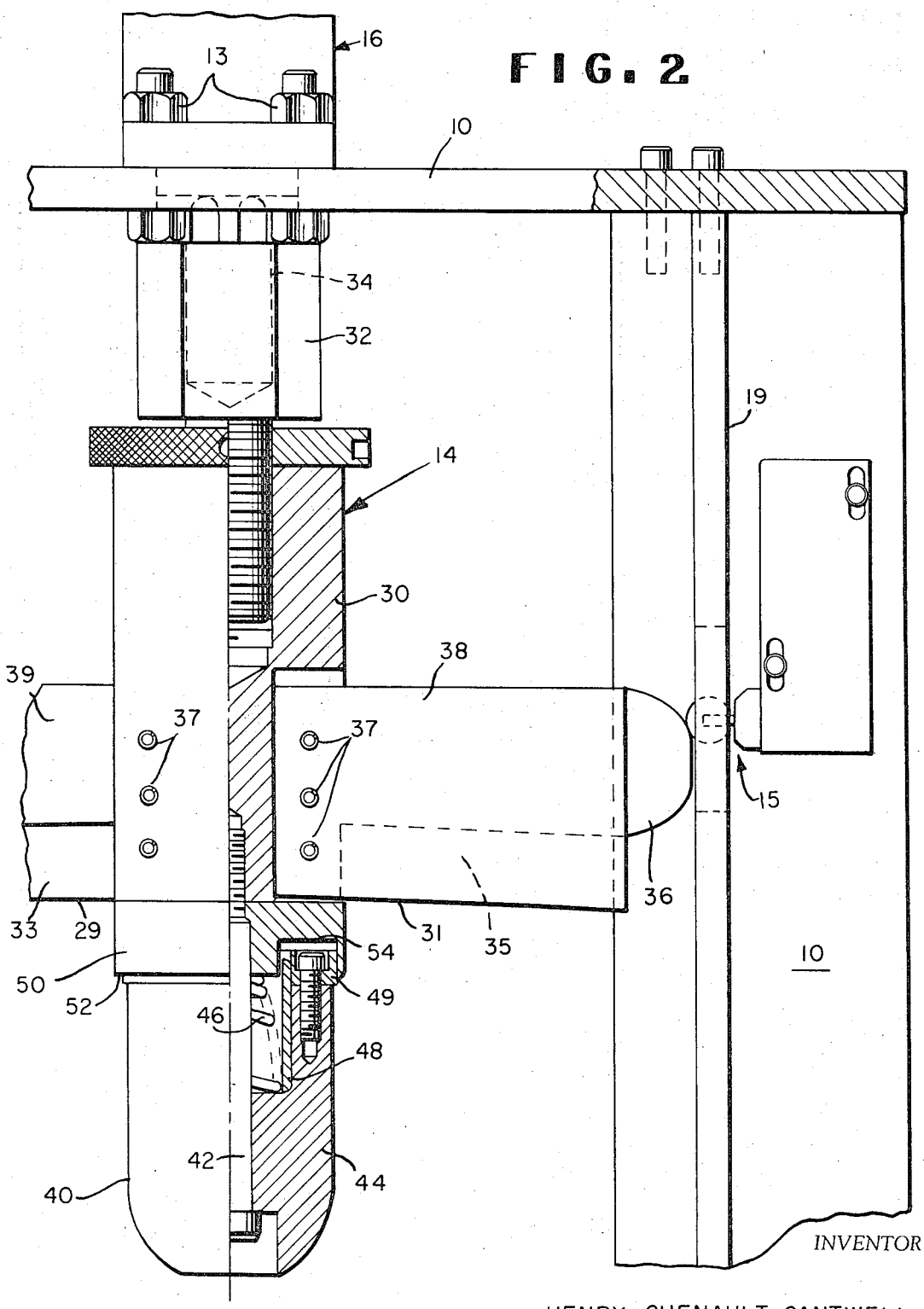

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JANUARY 26, 1971

882 O.G. 1347

T882,021
BOBBIN STRIPPER

Henry Chenault Cantwell, Waynesboro, Va., assignor to E. I. du Pont de Nemours and Company, Wilmington, Del., a corporation of Delaware

Filed May 21, 1970, Ser. No. 39,398
Int. Cl. D03d *45/58*
U.S. Cl. 28—19
2 Sheets Drawing. 6 Pages Specification

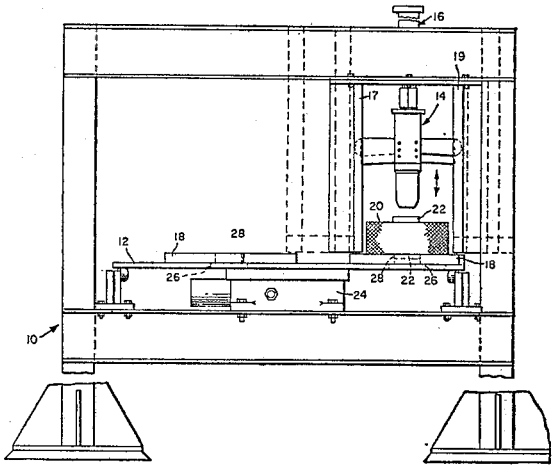

An apparatus for removing a cylindrical bobbin from its associated yarn package that includes a support for the package which allows the bobbin to pass freely therethrough and a ram mounted for reciprocal movement toward and away from the support. The ram has a knife blade attached to it above its point of engagement with the bobbin for cutting the yarn package as the ram presses the bobbin from the package. In the preferred embodiment, a multiposition movable support for packages is provided so successive positions may be moved under the ram for bobbin removal and cutting.

Jan. 26, 1971 H. C. CANTWELL T882,021

BOBBIN STRIPPER

Filed May 21, 1970 2 Sheets-Sheet 1

INVENTOR
HENRY CHENAULT CANTWELL

BY Howard P. West Jr.
ATTORNEY

BOBBIN STRIPPER

Filed May 21, 1970 2 Sheets-Sheet 2

INVENTOR

HENRY CHENAULT CANTWELL

BY Howard P. West Jr.
ATTORNEY